Patented Apr. 13, 1926.

1,580,265

UNITED STATES PATENT OFFICE.

JOSEPH BENSON MARVIN, JR., OF SARANAC LAKE, NEW YORK; GLADYS C. MARVIN EXECUTRIX OF SAID JOSEPH BENSON MARVIN, JR., DECEASED.

METHOD OF MAKING DYES.

No Drawing.     Application filed February 5, 1921. Serial No. 442,755.

*To all whom it may concern:*

Be it known that I, JOSEPH BENSON MARVIN, Jr., a citizen of the United States, and a resident of Saranac Lake, New York, have invented an Improvement in Methods of Making Dyes, of which the following is a specification.

My present invention relates to methods of preparing anthracene dyestuffs, such, for example, as the green dyestuff which may be made by condensing 1:4 dichlor anthraquinone α sulphonic acid, or one of its salts, with para toluidine ortho sulphonic acid or one of its salts. It is an object of the present invention to provide improved methods for making dyestuffs of the character specified whereby an economy of time, materials and manipulation may be effected and a considerable increase in the yield of the desired products rendered possible.

By way of example I shall, in the accompanying specification, set forth an illustrative embodiment of the method of my invention, it, however, being clearly understood that my invention is not limited to said illustrative embodiment which is herein set forth for purposes of example merely.

In connection with the aforesaid illustrative embodiment of the method of my invention, it may be desirable to briefly review the prior art to which the present invention relates. Taking as an example of the prior art German Patent No. 206,645, there is disclosed in example 3 of this patent a method for making a green dye out of 1:4 dichlor anthraquinone α sulphonic acid and para toluidine ortho sulphonic acid. In this patent sodium acetate is employed for removing the hydrochloric acid generated during the course of the reaction. The hydrochloric acid should be removed from the sphere of the reaction as soon as possible, since its presence serves to considerably diminish the yield of the desired end product.

For this purpose the sodium acetate is only very imperfectly suited, since the reaction should be neutral at all times during its course, sodium acetate rendering the reaction alkaline at the start and acid towards the end, both of which conditions are very undesirable. For instance, the sodium acetate, at the start of the reaction, brings about an alkalinity of the solution containing the 1:4 dichlor anthraquinone α sulphonic acid and the para toluidine ortho sulphonic acid, with consequent destruction of the 1:4 dichlor anthraquinone α sulphonic acid before it can enter into the desired reaction.

According to my invention I avoid the undesirable features referred to above and obtain a largely increased yield, not only by substituting for the sodium acetate hitherto employed, an altogether different class of substances which bring about the desired result much more efficiently and cheaply, but also by causing the reaction to take place in the presence of a catalyzer which I have discovered and which further serves to increase the yield of the desired end product and to prevent the destruction of either of the principal constituents employed in the reaction.

Turning now to the particular embodiment of my invention, which will herein be described by way of illustration, and taking a specific quantitative example, I take about 10 lbs. of 1:4 dichlor anthraquinone α sodium or other sulphonate. Instead of adding to this the sodium salt of para toluidine ortho sulphonic acid, which it is very difficult to obtain in a perfectly neutral condition and the lack of neutrality of which is very deleterious in the present reaction, I employ an alkaline earth salt of para toluidine ortho sulphonic acid, preferably the calcium salt of para toluidine ortho sulphonic acid.

For this purpose I take about 8 lbs. of para toluidine ortho sulphonic acid and add to the same an excess of calcium carbonate usually amounting, in the example given above, to about 6 lbs. Enough of the carbonate, or of its equivalent, should be used to constitute a slight excess over the amount needed to form the calcium or equivalent salt of para toluidine sulphonic acid and of the hydrochloric acid formed during the course of the reaction, and to neutralize any sodium acid sulphate initially present in the 1:4 dichlor anthraquinone α sulphonic acid, which acid sulphate is an almost constant accompaniment of the 1:4 dichlor anthraquinone α sulphonic acid. As a result of the reaction between a part of the calcium carbonate and the para toluidine ortho sulphonic acid there is formed the calcium salt of para toluidine ortho sulphonic acid, leaving an excess of uncombined and unaltered calcium carbonate, more than enough to neutralize any initial acidity of the 1:4 dichlor anthraquinone α sulphonic acid or its salts, and more than enough to neutralize all HCl formed during the condensation.

It is to be noted that the free calcium carbonate or its equivalent, such as a tertiary phosphate, is insoluble in water and is not hydrolyzed or changed into a soluble oxide or hydroxide at a temperature of less than 210° C. in the presence of water, this temperature being the usual upper limit of the reaction. Accordingly, the alkaline earth carbonate or tertiary phosphate acts to combine with the hydrochloric acid liberated during the course of the reaction and thus to remove it completely and effectively from the sphere of the reaction. Thus it acts far more cheaply and efficiently than the sodium acetate hitherto employed for a like purpose and without any of the deleterious effects resulting from the use of sodium acetate or the other substances hitherto employed in reactions of this same general character. In place of the calcium or other alkaline earth carbonate or the tertiary phosphate, any insoluble carbonate not changed into a soluble oxide or hydroxide under a temperature of about 210° C., such, for example, as lead carbonate, manganese carbonate, etc., may be employed.

I have further discovered that the desired reaction may be considerably accelerated and the yield greatly increased by the presence in the mixture during the course of the reaction of certain catalysts, which are of a metallic nature and which I shall designate here as metallic "argental" catalyzers. Of these catalyzers the principal and most important are silver and mercury. These catalysts may be combined in the form of a silver amalgam. The desired presence of the catalyst during the reaction may be brought about by employing a silver-lined or mercury-lined vessel or a vessel lined with silver amalgam; by using a silver or amalgamated stirrer, or a stirrer coated with silver amalgam. Or if desired, the catalyst may be added in a finely divided or even colloidal condition in the form of a silver powder or mercury suspension, or both, to the mixture of materials in which the desired reaction is sought to be brought about.

For example, if the 1:4 dichlor anthraquinone α sodium sulphonate is added to the mixture of calcium carbonate and calcium salt of para toluidine ortho sulphonic acid prepared as above, and if to the resulting mixture is added 1% of mercury or silver based on the weight of the 1:4 dichlor anthraquinone α sodium sulphonate employed, the yield of green dyestuff will be increased from about 10% to about 18% or more, above the yield which results where the catalysts of my invention are not employed. I have furthermore discovered that increasing the amount of mercury or silver, or their equivalents, beyond 1% based on the weight of the 1:4 dichlor anthraquinone α sodium sulphonate or its equivalent employed, does not substantially increase the yield of the desired green dyestuff.

The reaction of the above materials preferably takes place in a solution in from about 4 to about 6 gallons of water, preferably in an autoclave with or without stirring. The autoclave is preferably lined with quartz, although a suitable lining of enamel, alumina, aluminum silicates, silver, amalgamated or not, or their equivalents, if otherwise suitable, may be employed. I may also use a silver stirrer which may or may not be amalgamated, as desired.

The mixture is then maintained at a temperature of about 200° C. for ten hours in the autoclave, at the end of which time the autoclave is allowed to cool, its contents dissolved in water, and the green dyestuff recovered in the usual manner.

As an example of how the green dyestuff may be efficiently recovered, I may dissolve the cooled contents of the autoclave in about 40 gallons of water. The solution is then heated to a boil and salt added to make about a 20% salt solution, thus requiring the addition of about 65 lbs. of salt. The whole is now heated for from about 5 to about 10 minutes at a temperature of about 100° C., as by boiling, to break up the colloidal-like jelly resulting from the salting-out process. The mixture is now permitted to cool to ordinary temperature, is filtered and the precipitate washed with a 20% brine until the filtrate is clear.

The resulting cake of green dyestuff, calcium carbonate, and catalyzer, is removed and dissolved in from about 40 to about 60 gallons of water, which is preferably heated to about 90° C. Water at this temperature dissolves the dyestuff, leaving undissolved the calcium carbonate and the catalyzer. The whole is now filtered and the filtrate heated to a boil. The green dyestuff is now salted out by adding salt until a 20% salt solution is formed. The mixture is now boiled for from about 5 to 10 minutes. It is now permitted to cool slowly to ordinary temperature, filtered, and the green dyestuff washed with a 20% brine until the filtrate is clear. The dyestuff is now pressed, dried and ground.

The advantages of the present invention will clearly appear from the foregoing description. Considerable increases in yield are effected and a great economy in time, materials and manipulation brought about, all serving to make it possible to manufacture commercially and economically dyestuffs of the character specified above.

It is of course to be understood that my invention is not limited to the particular embodiments thereof herein described for purposes of illustration only.

What I claim is:

1. The method which comprises the step of reacting on 1:4 dichlor anthraquinone $\alpha$ sulphonic acid with para toluidine ortho sulphonic acid in the presence of a neutral, insoluble substance capable of combining with the hydrochloric acid liberated during the course of the reaction, and in the presence of a metallic catalyzer.

2. The method which comprises the step of reacting on 1:4 dichlor anthraquinone $\alpha$ sulphonic acid with para toluidine ortho sulphonic acid in the presence of an alkaline earth carbonate combining with the hydrochloric acid liberated during the course of the reaction and in the presence of a metallic catalyzer.

3. The method which comprises the step of reacting on 1:4 dichlor anthraquinone $\alpha$ sulphonic acid with an alkaline earth salt of para toluidine ortho sulphonic acid in the presence of a neutral, insoluble substance capable of combining with the hydrochloric acid liberated during the course of the reaction and in the presence of a silver amalgam.

4. The method which comprises the step of reacting on 1:4 dichlor anthraquinone $\alpha$ sulphonic acid with an alkaline earth salt of para toluidine ortho sulphonic acid in the presence of an insoluble neutral carbonate combining with the hydrochloric acid liberated during the course of the reaction and in the presence of a silver amalgam.

5. The method which comprises the step of reacting on 1:4 dichlor anthraquinone $\alpha$ sulphonic acid with the calcium salt of para toluidine ortho sulphonic acid in the presence of a neutral, insoluble substance capable of combining with the hydrochloric acid liberated during the course of the reaction and in the presence of subdivided metallic mercury.

6. The method which comprises the step of reacting on 1:4 dichlor anthraquinone $\alpha$ sulphonic acid with the calcium salt of para toluidine ortho sulphonic acid in the presence of calcium carbonate combining with the hydrochloric acid liberated during the course of the reaction and in the presence of subdivided metallic mercury.

7. The method which comprises adding to para toluidine ortho sulphonic acid an excess of an alkaline earth carbonate over what is required to produce the neutral alkaline earth salt of para toluidine ortho sulphonic acid and thereafter reacting on the resulting mixture with 1:4 dichlor anthraquinone $\alpha$ sulphonic acid, in the presence of a metallic catalyzer.

8. The method which comprises adding to para toluidine ortho sulphonic acid an excess of calcium carbonate over what is required to produce the neutral calcium salt of para toluidine ortho sulphonic acid and thereafter reacting on the resulting mixture with 1:4 dichlor anthraquinone $\alpha$ sulphonic acid, in the presence of a metallic catalyzer.

9. The method which comprises adding to para toluidine ortho sulphonic acid an excess of an alkaline earth carbonate over what is required to produce the neutral alkaline earth salt of para toluidine ortho sulphonic acid and thereafter reacting on the resulting mixture with 1:4 dichlor anthraquinone $\alpha$ sulphonic acid, in the presence of a finely divided silver amalgam.

10. The method which comprises adding to para toluidine ortho sulphonic acid an excess of calcium carbonate over what is required to produce the neutral calcium salt of para toluidine ortho sulphonic acid and thereafter reacting on the resulting mixture with 1:4 dichlor anthraquinone $\alpha$ sulphonic acid, in the presence of a finely divided silver amalgam.

11. The method which comprises adding to para toluidine ortho sulphonic acid an excess of an alkaline earth carbonate over what is required to produce the neutral alkaline earth salt of para toluidine ortho sulphonic acid and thereafter reacting on the resulting mixture with 1:4 dichlor anthraquinone $\alpha$ sulphonic acid, in the presence of metallic mercury.

12. The method which comprises adding to para toluidine ortho sulphonic acid an excess of calcium carbonate over what is required to produce the neutral calcium salt of para toluidine ortho sulphonic acid and thereafter reacting on the resulting mixture with 1:4 dichlor anthraquinone $\alpha$ sulphonic acid, in the presence of finely divided metallic mercury.

13. The method of recovering an anthraquinone dye by salting out the dyestuff from its solution, which comprises the steps of adding salt to the solution of the dyestuff to precipitate the dyestuff in the form of a jelly-like mass and thereafter heating the jelly-like mass at a temperature of about 100° C. to break up the jelly-like mass.

14. The method of recovering an anthraquinone dye by salting out the dyestuff from its solution, which comprises the steps of adding salt to the solution of the dyestuff to precipitate the dyestuff in the form of a jelly-like mass, heating the jelly-like mass at a temperature of about 100° C. to break up the jelly-like mass, filtering, redissolving the precipitated dyestuff, filtering the resulting solution, salting the dyestuff out of the filtrate in a form of jelly-like mass, and thereafter boiling the jelly-like mass of precipitated dyestuff to break up the same.

In testimony whereof, I have signed my name to this specification this first day of Feb., 1921.

JOSEPH BENSON MARVIN, Jr.